UNITED STATES PATENT OFFICE.

ANDREW THOMA, OF CAMBRIDGE, MASSACHUSETTS, ASSIGNOR TO NORTH AMERICAN CHEMICAL COMPANY, OF NEW YORK, N. Y., A CORPORATION OF MAINE.

TOUGH SHOE-BOTTOM FILLER.

1,121,689.      Specification of Letters Patent.      Patented Dec. 22, 1914.

No Drawing.      Application filed July 5, 1912. Serial No. 707,745.

*To all whom it may concern:*

Be it known that I, ANDREW THOMA, a citizen of the United States, and resident of Cambridge, county of Middlesex, State of Massachusetts, have invented an Improvement in Tough Shoe-Bottom Fillers, of which the following description is a specification.

My present invention is a shoe filling composition for filling the bottom cavities of welt shoes, and this application is mainly divided out from and a continuation of my previous application Serial No. 432,083 filed May 11, 1908 which has now become Patent No. 1,032,312, dated July 9, 1912.

In my Patent No. 945,294 of January 4, 1910 (whose application was pending at the same time as the aforesaid application Serial No. 432,083 of which this is largely a division, as stated) I discuss the effect upon glue, of certain modifying agents in a shoe filling composition. The agent in particular is wax tailings, a residuum of petroleum, and my present invention relates to the same general composition, but with a refinement not disclosed in said patent, the present invention being to a specific composition and application of the binder to the filler mass. In my application Serial No. 432,083 viz., the Patent 1,032,312 above referred to (copending, as stated, with my Patent No. 945,294) I discuss the effect of several modifiers or restrainers for the wax tailings, the specific claims being for a restrainer of a pasty nature. In my application Serial No. 591,207 filed November 7, 1910 (subordinate to my Patent No. 945,294 above mentioned) I have claimed a sticky tenacious water-repellent component modified by glue and have stated that my said component may be various combinations of resinous tarry or pitchy ingredients, mentioning among others wax tailings, but my specific claims therein are for resinous ingredients made sticky by suitable agents. Also in this last mentioned application and in my Patent No. 945,294, the gluey component is the predominating element or base of the binder, and the wax tailings is simply a water-repellent element (and incidentally cementitious), whereas in my Patent 1,032,312 the wax tailings is the predominating component and is depended upon mainly for the cementing as well as the water-proofing of the composition, while the gelatinous or gluey preparation is merely for restraining (being incidentally cementitious) and is sluggish and smeary. The present application (divisional in part and a continuation in part, as already explained) aims to protect the species left unprotected specifically (*i. e.* left without specific claims thereto), viz., wax tailings of a soft free-flowing variety (which is generally the stickier kind) modified by an adhesive of animal origin to prevent the too ready absorption of the tailings by the filler-body material, while at the same time protecting the further refinement of the invention which resides in so balancing the two components that each constitutes a base or binder, the glue being reduced to a thin highly fluid free-flowing condition, holding the soft low melting wax tailings in such finely subdivided and distributed condition throughout this fluid that the two together are capable of receiving and intermingling with a much greater amount of dry comminuted cork than was possible in the ways previously disclosed.

As disclosed in the first mentioned application aforesaid (Patent 1,032,312), which is in part, a derivative of my Patent No. 832,002 of September 25, 1906, I have stated that several materials have qualities which adapt them for use as binders in shoe filling compositions, *i. e.* compositions used in filling in the inner soles or bottom cavities of welt shoes. These compositions are usually of cork or of ground leather and a suitable binder. The wax tailings already mentioned (a product of petroleum distillation) is as stated in that application, a suitable binder, and, because it is sticky, tenacious, always the same, and easily responsive to, or sensitive to, heat, is very well suited to the purpose. Some forms of it, especially the softer stickier varieties, have, however, a too ready tendency to flux under heat and to be easily absorbed by the body material and, being so sticky, have a tendency to follow the knife (if cold) of the operator in the act of filling the shoe bottom cavity. Accordingly, I introduce with this waxy gummy pitchy material, a restraining slow drying component, and the one that I have found very useful for the purpose and which is one of the essential features, according to the specific claims of the present application (and which, as will presently appear, is better or an improvement over the dry powders of the original application Serial No. 432,083) is a size or adhesive of animal origin such as glue or gelatin and its analogues; and the combination of a waxy base of a permanently sticky, tenacious, heat-responsive and quick-setting adhesive of the kind stated with such a size or animal adhesive under the conditions stated, is the subject of my present invention in its more complete embodiment.

Animal sizes are gelatins and albuminates, the latter including principally albumen and casein. My present invention, while broadly for an adhesive of animal origin, is specifically for gelatin. Chemists use the plural form—gelatins—to designate compounds slightly differing from each other in origin and constitution, but I prefer to use in the present case but one word, gelatin, to include all these. Probably its animal origin in some way which I am not able to explain, accounts for its rather peculiar adaptability to a filler in the bottom cavity of a leather shoe, particularly when the body material of the filler is leather scrap. Leather, it should be observed, consists largely of glutinous, cartilaginous material, hardened by tannin, or, in the case of chrome tanned leather, by chromic acid compounds. Glue or gelatin, and I here use these words interchangeably, has a peculiar affinity for leather provided it is not greasy, and unites readily with it. Glue swells in cold water and becomes viscous and gelatinous. It is dissolved without much difficulty in hot water. Glue is also not only a restrainer but introduces the quality of extreme tenacity or toughness.

First I make a thin free-flowing solution of the glue by subjecting the swelled glue to a hot water bath to render it free-flowing. To this thin free-flowing heated liquid or glue solution I add my waxy binder also hot, generally wax tailings, although I may use any or all, in whole or in part, of the substances mentioned and referred to in my application Serial No. 432,083, aforesaid (Patent 1,032,312). These are thoroughly intermixed in a stirrer or mixer until the heavier, stickier wax tailings become entirely cut up or subdivided into exceedingly small particles and distributed in suspension throughout the thin solution so that both components are in a thin liquid form. The fluid is then poured into the required mass of dry comminuted filler-body material, preferably granular cork, in a revolving mixing machine. Because of the extremely free-flowing condition of the wax tailings and its thin gluey separator, the distribution of the wax tailings throughout the cork is accomplished with a remarkable evenness and tenuity. Notwithstanding the fact that the wax tailings are so exceedingly sticky, they are dulled and separated into exceedingly small globules (almost into molecules) so that they slip as it were over the cork, being carried by the slippery thin gluey solution. By this means I have found that I can succeed in carrying throughout the entire mass enough of the tailings to accomplish the purpose of a perfect binder and yet such a minimum amount that the filler seems to be practically of cork. It will be understood that the ideal filler would be pure cork provided it could be introduced into the shoe in a plastic form so that it could be made to conform to the irregular bottom cavity and yet caused to adhere, cohere and set to a practically permanent sheet. This is doubtless impossible, but my invention brings this ideal filler very nearly to realization. It is best that the cork or other filler-body material be added last, as in that case the absorption of the binder proceeds to the least extent. The reason for this is that the resistant or modifying effect of the glue upon the wax tailings is then complete and also the tailings are held in the separated globular condition explained above so that they cannot come in direct contact with the cork granules, but instead thereof the fluid vehicle or medium comes in direct contact with the cork so that whatever absorption there is is of the moisture, and the glue in suspension or solution therein coats the granule like a varnish and stops the otherwise penetrative soft tailings from ever getting sufficiently close access to the cork to be able to penetrate the same. The fact of adding the cork last may be recognized in the product by the characteristic last explained. The wax tailings suitable for this composition, as it ordinarily comes, is liable to be too readily absorbed by the cork or other 'filler-body material' and too great an amount thereof is incorporated in the filler when used alone, and the cork mass becomes clogged and correspondingly heavy, loses its vitality and resiliency, and makes the material cost more as well as being too heavy (by taking too much of the tailings). The glue prevents this absorption from being carried further than the surface of each particle of the filler granules, leaving in general an untouched resilient natural core for each particle. This stays resilient during the life of the shoe. The unrestrained binder is also too sticky for proper handling by the operator in the shoe factory and is apt to follow the knife of the operator, giving him trouble sometimes to the extent of pulling the filler from the shoe bottom (unless the tool is hot). The glue, etc, prevents this.

While it is possible to furnish the binder composition, as stated above, to the shoe manufacturer for him to liquefy by heat and mix in his own filler-body material, I prefer to furnish the fully prepared filler to the shoe manufacturer ready for use. To accomplish this it is necessary to have the cementitious elements and also the stiffening elements latent or inactive in the filler mass, but in such a condition that it may be immediately developed by steam or moist heat. The filler when made as above explained meets this condition because the gluey stiffener is held latent in a jellified mass or condition when it becomes cool by reason of the contained wax tailings in the finely intermingled disseminated and subdivided condition explained above. When the steam or moist heat is subsequently applied to this filler in the shoe factory, the moisture swells this jellified body, and the moist heat renders the latent qualities of the glue active and at the same time brings the contained tailings into the highest degree of efficiency, and gives the mass a sleek workable condition. When it is spread in the shoe by means of a usual hot tool and thereafter permitted to set, it will not thereafter respond to any heat condition to which the shoe may be subjected in ordinary use. In fact the complete filler will not respond to dry heat under any conditions.

To render the filler more susceptible to the influence of said hot moisture and less liable to harden in bulk (after it has been manufactured for sale and before it has been put into use in the shoe factory) I introduce into the mixture of glue in a free-flowing solution suitable fluxing and softening means, as treacle, glycerin, olein oil, glucose, or any non-evaporable suitable fluid or any combination thereof, or chemical means (such for instance as calcium chlorid or other chemical salts or solutions) to hold the proteid in a condition when cold responsive to moisture. The filler, made according to my present invention, can be either pressed into loaf form or brick-like packages, or it may be made into a loose granulated condition only slightly cohesive until subsequently heated with moist heat. My filler, with the glue in its semi-swelled or jellified condition or treated condition, as the case may be, will respond to the action of steam quicker than when simply dissolved in water and more or less dried before use. When the softeners are used, as above mentioned, they serve to retard the glue from setting hard and horn like and cause it to remain still more susceptible to the steaming influence necessary to render my present filler most effective and quickly responsive. Only enough treacle, glycerin, etc., is used to render the glue susceptible to moist heat without impairing its tenacious binding qualities and without influencing its ultimate firm setting nature whereby it retards the tailings (which are otherwise responsive to dry heat) so as to form a permanently pliable binding mass non-responsive to ordinary conditions of heat in use. The treacle or molasses for instance, enters into a complete union with the glue and prevents its horn like resetting, and, as the treacle is exceedingly sensitive to water it causes the filler to respond much quicker to the moist heat. My invention provides a very tenacious filler binder which does not depend wholly for its strength upon the sticky waxy gummy component of the composition. Filler treated in this way when applied steamed will set more readily than when a cold solution of glue is mixed with cork and used in that state because there is less water to evaporate. My invention makes it practicable to apply the restraining agent of the wax tailings in a heated condition to both the tailings and the filler-body material in a thin free-flowing solution.

I have attempted to give no formula, as the constituents of my composition vary in nature to such an extent that a formula is of little value. I have endeavored to indicate the physical conditions or consistencies sought to be attained and these are a sufficient guide to a skilled workman.

As already stated, I may leave out the filler-body material and package the compound of glue, tailings and water (whether the glue be treated with the softeners or not) leaving the manufacturer to add the filler body of ground waste leather or the like. I may also leave out the water leaving the manufacturer to add the water. It is also possible to introduce the glue or gelatin in a powdered condition (especially when introduced in conjunction with other powders with cementitious paste-making components or simply filling components, such as infusorial earth or plaster of Paris, as in my application Serial No. 705,135) in which case the glue forms simply the tenacious or strength giving part of the binder,—and if plaster of Paris is also present, its setting within the mass will hold in control the gluey component against the subsequent attack of moisture or heat. So, the wax tailings may be omitted and the cork granules simply coated with the gluey solution in such a condition as to enable the shoe manufacturer to render the mass plastic by steam or moisture for use.

I may supplement the glue or gelatin in part by additions of starch paste, gluten, vegetable gums, dextrin, casein, albumen, or soluble silicates, or by their equivalents, depending upon the gluey component as the tenacious element of the composition.

Having described my invention, what I claim as new and desire to secure by Letters Patent is:

1. A shoe-filler composition comprising glue and sticky, soft wax tailings.

2. A shoe-filler composition, comprising glue, sticky, soft wax tailings, and a comminuted filler-body material for a shoe filler.

3. A shoe-filler composition comprising an adhesive of animal origin and sticky, soft wax tailings.

4. A shoe-filler composition, comprising an adhesive of animal origin, sticky, soft, wax tailings, and a comminuted filler-body material for a shoe-filler.

5. A shoe-filler, comprising an adhesive of animal origin, sticky, soft, wax tailings, and a comminuted porous material, for a shoe filler.

6. A shoe-filler, comprising granulated cork having its granules thinly coated with a thin solution of glue in a soluble condition to respond to moist heat and when set becoming permanently pliable, tenacious, adherent, and non-responsive to dry heat under normal conditions of use.

7. The combination in a shoe-filling composition, of a permanently sticky, tenacious, slow-drying adhesive, finely subdivided and disseminated in a thin restraining agent mainly glue, and a granular filler-body having its granules lightly coated therewith to constitute a plastic, permanently pliable, resilient, and leather-adherent mass, rendered moldable by moist heat for laying and molding in a shoe-bottom cavity.

8. A shoe-filler composition, comprising sticky, soft, wax tailings, glue, moisture, and comminuted filler-body material, the latter being non-penetrated by the tailings as when added last.

9. A shoe-filler composition, comprising a permanently sticky, tenacious adhesive, a restrainer consisting of an adhesive of animal origin, and a comminuted filler-body material, the filler body-material being non-penetrated by the sticky adhesive as when added last and the sticky qualities of the filler being held latent and capable of development for use by moist heat at a moderate temperature not injurious to cork and leather, and all compounded to a permanently pliable, resilient, plastic, leather-adherent mass readily moldable in a shoe-bottom.

10. A shoe-filler composition, comprising a permanently sticky, tenacious binder consisting mainly of sticky, soft wax tailings, and a gelatinized restrainer consisting mainly of glue, and a comminuted filler-body material.

11. A shoe-filler composition, comprising a permanently sticky, tenacious component, an adhesive of animal origin in a mucilaginous condition, and a granular filler-body material, the materials being so proportioned and mixed that the absorption of the first mentioned component into the particles of the body-material is only partial whereby each of said particles retains a core practically free from said absorbable component, said core having its natural resiliency practically intact and the whole having a permanently pliable and plastic consistency, normally adherent to leather and rendered moldable by moderate moist heat for laying and molding in a shoe-bottom.

12. A composition for binding together comminuted filler-body material, comprising a mucilaginous solution of animal origin, and a sticky, gummy component carried thereby in a finely suspended condition compounded into a moldable, coherent mass, pliable and non-shifting when set, having a doughy consistency before setting and responsive to moist heat.

13. A composition for binding together comminuted filler-body material, comprising a mucilaginous solution of animal origin, and a sticky, gummy component consisting at least in part of soft wax tailings carried thereby in a finely suspended condition.

14. A shoe-filler composition, comprising sticky, soft wax tailings, an adhesive of animal origin in a mucilaginous condition, and a granular resilient filler-body material the materials being so proportioned and mixed that the absorption of the tailings into the particles of the body material is only partial, whereby each of said particles retains a core practically free from the absorbable tailings, said core having its natural resiliency practically intact.

15. A shoe-filler composition, comprising a thin fluid binder composed at least in part of a glue in solution containing a non-volatile softening solvent, and a sticky waxy component carried by said solution of glue in a finely suspended condition, combined with comminuted body-material having its particles coated with said thin binder into a plastic, permanently pliable, leather-adherent mass.

16. A shoe-filler composition, comprising an animal adhesive and a non-volatile softener, and soft wax tailings carried thereby in a finely subdivided condition, all in the form of a thin solution, and comminuted body-material thoroughly intermixed in said solution to a comparatively stiff workable condition.

In testimony whereof, I have signed my name to this specification, in the presence of two subscribing witnesses.

ANDREW THOMA.

Witnesses:
 JAMES R. HODDER,
 CLYDE L. ROGERS.

Copies of this patent may be obtained for five cents each, by addressing the "Commissioner of Patents, Washington, D. C."